United States Patent [19]
Nakanishi et al.

[11] Patent Number: 6,157,420
[45] Date of Patent: *Dec. 5, 2000

[54] PROJECTION-TYPE IMAGE DISPLAY APPARATUS

[75] Inventors: Hiroshi Nakanishi, Sakurai; Hiroshi Hamada; Yutaka Takafuji, both of Nara, all of Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/049,923

[22] Filed: Mar. 30, 1998

[30] Foreign Application Priority Data

Mar. 31, 1997 [JP] Japan .................................. 9-081589

[51] Int. Cl.⁷ .................................................. G02F 1/1335
[52] U.S. Cl. .................................. 349/9; 353/34; 353/84
[58] Field of Search .................................. 349/8, 9, 104, 349/105; 359/496, 497, 498; 353/34, 33, 36, 81, 84

[56] References Cited

U.S. PATENT DOCUMENTS

| | | | |
|---|---|---|---|
| 5,172,222 | 12/1992 | Plantier et al. | 349/8 |
| 5,237,435 | 8/1993 | Kurematsu et al. | 349/8 |
| 5,245,449 | 9/1993 | Ooi et al. | 349/10 |
| 5,541,673 | 7/1996 | Shioya et al. | 348/752 |
| 5,648,870 | 7/1997 | Mitustake | 359/497 |
| 5,749,641 | 5/1998 | Brice et al. | 353/81 |
| 5,798,819 | 8/1998 | Hattori et al. | 353/33 |
| 5,812,223 | 9/1998 | Noguchi | 349/8 |

FOREIGN PATENT DOCUMENTS

| | | |
|---|---|---|
| 59-230383 | 12/1984 | Japan . |
| 4-319910 | 11/1992 | Japan . |
| 4-338721 | 11/1992 | Japan . |

OTHER PUBLICATIONS

Hornbeck, "Current Status of the Digital Micromirror Device (DMD) for Projection Television Applications", 0–7803–1450–6, IEEE, IEDM 1993, pp. 381–384.

*Primary Examiner*—Kenneth Parker
*Attorney, Agent, or Firm*—Nixon & Vanderhye P.C.

[57] ABSTRACT

A projection-type display apparatus includes a light source; a color separating/synthesizing device arranged to divide light from the light source into three different color light rays; and three reflection-type display devices arranged to reflect the three different color light rays, respectively. The color separating/synthesizing device is further arranged to synthesize the three different color light rays respectively reflected by the three reflection display devices. The color separating/synthesizing device has transmittance of substantially 50% for each of a s-polarized light ray having a first wavelength and a p-polarized light ray having a second wavelength. A difference between the first wavelength of the s-polarized light ray and the second wavelength of the p-polarized light ray is equal to or less than 40 nm.

11 Claims, 17 Drawing Sheets

Spectral characteristics of 6-B filter

Spectral characteristics of 6-R filter

Spectral characteristics at 4B reflection plane

Spectral characteristics at 4R reflection plane

Liquid crystal molecules randomly aligned (No voltage applied)

Liquid crystal molecules aligned in electric field direction (Voltage applied)

6-R filter

6-B filter

6-G filter

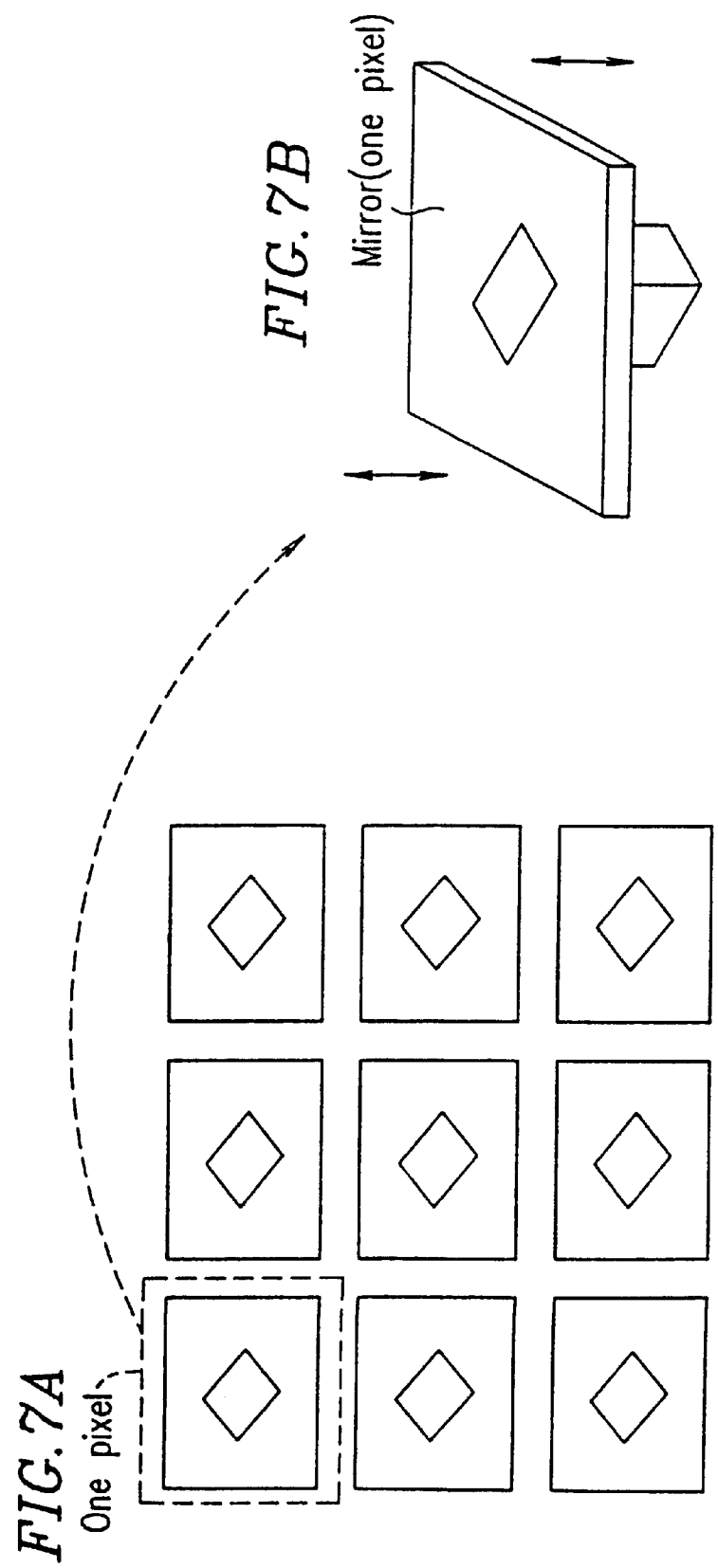

PRIOR ART

PRIOR ART

PRIOR ART

———— B reflection (P-polarized light)
- - - - - B reflection (S-polarized light)
—·—·— R reflection (P-polarized light)
—··—··— R reflection (S-polarized light)

PROJECTION-TYPE IMAGE DISPLAY APPARATUS

BACKGROUND OF THE INVENTION

1. Field of the Invention

The present invention generally relates to a projection-type image display apparatus for use in systems such as a compact projection-type color liquid crystal television system and an information display system, and more particularly, the present invention relates to a projection-type image display apparatus for achieving color display using three image display devices.

2. Description of the Related Art

In a liquid crystal display device, a driving voltage is independently applied to pixel electrodes regularly arranged in a matrix. Optical characteristics of a liquid crystal material are changed in response to the voltage application, whereby images, characters, and the like are displayed. Methods for independently applying a driving voltage to such pixel electrodes as described above include a simple matrix address method, and an active matrix address method in which non-linear 2-terminal elements or 3-terminal elements are provided in the liquid crystal display device.

In the active matrix address method, provision of switching elements such as MIM (Metal-Insulator-Metal) elements and TFT (Thin Film Transistor) elements, and signal lines for supplying a driving voltage to the pixel electrodes is required. In the case where high-intensity light is incident on such switching elements, a resistance of the switching elements during an OFF state is reduced. Therefore, charges accumulated during application of a voltage are discharged. Moreover, a driving voltage is not properly applied to portions of such a liquid crystal which are in a region where the switching elements or the line electrodes are formed. As a result, a correct display operation is not performed, and leakage of light occurs even in a black state, causing reduction in contrast ratio.

Accordingly, in the case where a transmission-type liquid crystal display device is used, light must be prevented from entering the above-mentioned region. This is achieved by providing a light-shielding element, i.e., a black matrix 102, as shown in FIG. 10, on a substrate facing a TFT substrate with a liquid crystal layer interposed therebetween. The switching elements such as a TFT 101 and pixel electrodes are provided on the TFT substrate. As a result, light is prevented from entering the transmission-type liquid crystal display device by the TFT 101, a gate bus line 103, and a source bus line 104 each having a light-shielding property, as well as by the black matrix 102. Accordingly, the area of an effective pixel opening in the pixel region, that is, the numerical aperture, is reduced.

Reduction in size of the switching elements and the signal lines is limited due to the electric performance thereof and limitation of the manufacturing technology. However, attempts have been made to make liquid crystal display devices smaller. In order to produce a smaller liquid crystal display device, the pitch between the pixel electrodes should be reduced. However, the smaller the pitch is, the more the numerical aperture is reduced.

Now, a conventional projection-type image display apparatus using such a liquid crystal display device as mentioned above will be described.

A projection-type color image display apparatus using a liquid crystal display device(s) is categorized into a single-plate type (mode) using only one liquid crystal display device, and a three-plate type (mode) using three liquid crystal display devices respectively corresponding to light in wavelength ranges of three primary colors, i.e., corresponding to light in red (R), blue (B), and green (B) wavelength ranges (hereinafter, referred to as R, G and B color light rays, respectively). In the single-plate type, an image formed by a liquid crystal display device having a color filter of R, G and B arrangement is projected onto a screen. The R, G and B arrangement of the color filter is of a mosaic type, a stripe type, or the like. Such a single-plate type is disclosed in, for example, Japanese Laid-Open Publication No. 59-230383. The single-plate type uses only one liquid crystal display device, and therefore, an optical system required in the single-plate type is simple as compared to the case of the three-plate type. Accordingly, the single-plate type is suitable for reduction in cost and size of the projection-type system. However, about ⅔ of light emitted from a light source is absorbed by the color filter. Therefore, illuminance is generally low in the single-plate type.

On the other hand, in the three-plate type, an optical system for dividing white light emitted from a light source into R, G and B color light rays, and liquid crystal display devices for forming an image corresponding to the respective color light rays are separately provided so as to make the respective images optically overlap each other to produce full-color display on a screen. In this structure of the three-plate type, a mechanism for adjusting light convergence in the three liquid crystal display devices, and optical parts for separating/synthesizing R, G and B color light rays are required, making the structure more complex. However, white light emitted from a light source can be utilized effectively, whereby higher luminance can be achieved as compared to the single-plate type.

The numerical aperture is reduced as a liquid crystal display device is reduced in size, as described above. Accordingly, in the case where a smaller transmission-type liquid crystal display device is used in a projection-type image display apparatus, sufficient brightness is less likely to be obtained even by the three-plate type. Therefore, a projection-type image display apparatus using a reflection-type liquid crystal display device has been developed in order to solve this problem.

In a reflection-type liquid crystal display device, a reflective pixel electrode 100 can be formed on the TFT 101 serving as a switching element, as shown in FIG. 11. Therefore, in the case where the reflection-type liquid crystal display device and the transmission-type liquid crystal display device are the same in size, the reflection-type liquid crystal display device can achieve higher numerical aperture than that of the transmission-type liquid crystal display device. Such higher numerical aperture is very effective to improve brightness achieved by the projection-type image display apparatus.

A combination of a polarization beam splitter (hereinafter, referred to as PBS) for dividing white light emitted from a light source into p-polarized light and s-polarized light and a cross dichroic prism for dividing white light into R, G and B color light rays, together with such a reflection-type liquid crystal display device has been proposed in Japanese Laid-Open Publication No. 4-338721. However, Japanese Laid-Open Publication No. 4-338721 mentions neither the fact that spectral characteristics of the cross dichroic prism are different between p-polarized light and s-polarized light entering the cross dichroic prism, nor the influence of such a difference upon the display characteristics of projection. These problems will be discussed below.

In addition, Japanese Laid-Open Publication No. 4-319910 discloses a projection-type liquid crystal display apparatus using a light-scattering liquid crystal display device as a reflection-type liquid crystal display device and including a Schlieren optical system. However, Japanese Laid-Open Publication No. 4-319910 does not mention the influence of the use of the light-scattering liquid crystal display device upon the color-separation characteristics of the cross dichroic prism.

The above-mentioned Japanese Laid-Open Publication No. 4-338721 discloses an apparatus including a reflection-type liquid crystal display device in a birefringence mode. According to the publication, incident light to the cross-dichroic prism enters into the reflection-type LCD device and is reflected thereby. The reflected light enters into the cross-dichroic prism again. The polarization direction of the incident light is rotated by 90° from that of the reflected light. The cross dichroic prism is generally highly dependent upon the polarization state at its reflection plane. Accordingly, the spectral characteristics of the cross dichroic prism in the case of dividing white light into R, G and B color light rays are significantly different from those in the case of synthesizing the divided color light rays.

FIG. 12A shows an example of the spectral characteristics of the cross dichroic prism with respect to reflected B color light rays having s-polarization and p-polarization. FIG. 12B shows an example of the spectral characteristics of the cross dichroic prism with respect to reflected R color light rays having s-polarization and p-polarization. As can be seen from FIGS. 12A and 12B, p-polarized light has a smaller wavelength range than that of s-polarized light in the case of R and B color light rays. In the case of a G color light ray, s-polarized light has a smaller wavelength range than that of p-polarized light. Consequently, the brightness and the range of color reproduction of projection highly depend upon the p-polarized light having a smaller wavelength range in the case of the R and B color light rays, while highly depending upon the s-polarized light having a smaller wavelength range in the case of the G color light ray, in spite of the fact that both s-polarized light and p-polarized light enter the cross dichroic prism. Accordingly, R and B color light rays are restricted by p-polarized light, whereas a G color light ray is restricted by s-polarized light.

In such a case, when the brightness and the range of color reproduction of the R and B color light rays are adjusted, the wavelength range of the G color light ray is reduced as shown by the shaded portion of FIG. 13A, adversely affecting display and white balance of the G color light ray. On the other hand, when the brightness and the range of color reproduction of the G color light ray are adjusted, respective wavelength ranges of the R and B color light rays are reduced as shown by the shaded portions of FIG. 13B, adversely affecting display and white balance of the R and B color light rays.

Moreover, in the case where the spectral characteristics are different between p-polarized light and s-polarized light, the following problems will occur. As shown in FIG. 14, when-s-polarized light, for example, enters a cross dichroic prism 14, s-polarized light (a) in the R wavelength range is reflected at the cross dichroic prism 14 into a reflection-type liquid crystal display device 5-R corresponding to an R color light ray. Then, the s-polarized light (a) is reflected by the reflection-type liquid crystal display device 5-R with its polarization state being changed in accordance with an image signal. The resultant light contains a p-polarized light component. Therefore, light (b) corresponding to the portion a in FIG. 12B which will be described later passes through an R reflection plane of the cross dichroic prism 14 into a reflection-type liquid crystal display device 5-B correspond-ing to a B color light ray. This p-polarized light is again changed to s-polarized light by the liquid crystal display device 5-B. In this case, the resultant s-polarized light (c) will not be reflected back to the liquid crystal display device 5-R, but to a reflection-type liquid crystal display device 5-G corresponding to a G color light ray. The s-polarized light is again changed to p-polarized light by the liquid crystal display device 5-G. In this case, the resultant p-polarized light (d) is reflected from the liquid crystal display 5-G, passing through the R reflection plane of the cross dichroic prism 14 into a projection lens. As a result, the light is projected onto a screen as stray light or a ghost image.

The same problems of stray light and ghost images as described above will also occur in the case of a B color light ray. Even in the case where p-polarized light is directed into the cross dichroic prism 14, the problems of stray light and ghost images will occur based on the same principles.

In Japanese Laid-Open Publication No. 4-319910, a light-scattering liquid crystal display device is used. Therefore, basically, random polarized light enters a cross dichroic prism. Accordingly, such shifting of a spectrum between incident light and outgoing light as generated in the case of the reflection-type liquid crystal display device in a birefringence mode will not occur. However, with respect to the random polarized light, the cross dichroic prism will have mean spectral characteristics of p-polarized light and s-polarized light at its color separating plane. As a result, the spectral characteristics have a less sharp rise or fall at the boundary between transmission and reflection, showing a stepped shape at the transmittance of about 50%, as shown in FIGS. 15A and 15B. Therefore, color purity of R, G and B wavelength ranges as well as light utilization efficiency are significantly degraded.

SUMMARY OF THE INVENTION

According to one aspect of the present invention, a projection-type display apparatus includes a light source; a color separating/synthesizing device arranged to divide light from the light source into three different color light rays; and three reflection-type display devices arranged to reflect the three different color light rays, respectively. The color separating/synthesizing device is further arranged to synthesize the three different color light rays respectively reflected by the three reflection display devices. The color separating/synthesizing device has transmittance of substantially 50% for each of a s-polarized light ray having a first wavelength and a p-polarized light ray having a second wavelength. A difference between the first wavelength of the s-polarized light ray and the second wavelength of the p-polarized light ray is equal to or less than 40 nm.

In one example, a projection-type display apparatus further includes a polarized-light separating device arranged to reflect a first polarized light ray from the light source at a predetermined angle, while transmitting a second polarized light ray. The first polarized light ray has a first polarization state. The second polarized light ray has a second polarization state different from the first polarization state. The polarized-light separating device is further arranged to direct one of the first and second polarized light rays into the color separating/synthesizing device. Each of the three reflection-type display devices is a birefringence-mode display device which changes polarization of the one of the two different polarized light.

In one example, each of the three reflection-type display devices is a light-scattering liquid crystal display device, and the projection-type display apparatus further includes a Schlieren optical system arranged to selectively project light scattered at the light-scattering liquid crystal display devices onto a screen.

In one example, each of the three reflection-type display devices is a display device capable of changing an angle of outgoing light to a prescribed angle, and the projection-type display apparatus further includes an optical system arranged to selectively project outgoing light onto a screen according to an angle of the outgoing light.

In one example, a projection-type display apparatus, further includes a color trimming device arranged in an optical path between the light source and at least one of the three reflection-type display devices so as to restrict a range of wavelength of at least one of a red color light ray, a green color light ray and a blue color light ray reflected or transmitted by the color separating/synthesizing device, each of the light rays having s-polarization.

In one example, a projection-type display apparatus further includes a color trimming device arranged in an optical path between the light source and at least one of the three reflection-type display devices so as to restrict a range of wavelength of at least one of a red color light ray, a green color light ray and a blue color light ray reflected or transmitted by the color separating/synthesizing device, each of the light rays having random polarization.

In one example, the color separating/synthesizing device includes a cross dichroic prism.

In one example, the color separating/synthesizing device includes two dichroic mirrors.

According to another aspect of the present invention, since a difference in cutoff wavelength between p-polarized light and s-polarized light in the color separating/synthesizing device is set to about 40 nm or less, required light is effectively separated/synthesized. As a result, an image having excellent color purity and excellent white balance can be achieved.

In one example of the present invention, a liquid crystal display device in a birefringence mode is used. Accordingly, color purity obtained by a projection system is substantially determined by the spectral characteristics of p-polarized light entering the color separating/synthesizing device in the case of R and B color light rays, while being substantially determined by the spectral characteristics of s-polarized light entering the color separating/synthesizing device in the case to a G color light ray. The spectral characteristics therefore show a sharp rise (or a sharp fall) at the cutoff wavelength as shown in FIG. 16. Therefore, a bright image having a broad range of color reproduction can be achieved.

According to still another aspect of the present invention, an image display device in a non-polarization mode is used. As a result, both p-polarized light and s-polarized light contained in light emitted from a light source can be efficiently utilized. Moreover, a brighter image can be achieved for the same reason as that in the case of the one aspect of the present invention described above with reference to FIG. 16.

In one example, a reflection-type liquid crystal display device in a light-scattering mode and a Schlieren optical system are used. Accordingly, scattering light and non-scattering light can be efficiently separated from each other. As a result, a bright image with high contrast can be achieved.

In one example, a reflection-type image display device capable of changing the angle of outgoing light from the image display device to a prescribed angle, and an optical system for selectively removing outgoing light from the reflection-type image display device according to the angle of the outgoing light are used. As a result, a bright image with high contrast can be achieved.

In one example, a color restricting device such as a filter is provided. Accordingly, stray light and ghost images which result from the shaded portion a of FIG. 12B which will be described later can be prevented.

In the case where a reflection-type image display device in a non-polarization mode is used, random polarized light will enter the color separating/synthesizing device. Accordingly, with respect to light separated by the color separating/synthesizing device, the color separating/synthesizing device will have mean spectral characteristics of p-polarized light and s-polarized light as shown in FIGS. 15A and 15B. Therefore, for R, G and B color light rays, the spectral characteristics show a less sharp rise or fall at the cutoff wavelength than in the case where an image display device in the birefringence mode is used. As a result, color purity of R, G and B color light rays is reduced. In order to overcome these problems, an image display apparatus can be structured as follows:

In one example, a color restricting device such as a filter is provided, whereby reduction in color purity of R, G and B color light rays, which is caused by the inferior rising or falling characteristics at the cutoff wavelength as described above, can be prevented. As a result, an image having a broad range of color reproduction can be achieved.

Thus, the invention described herein makes possible the advantage of providing a projection-type image display apparatus having high resolution and a broad range of color reproduction.

These and other advantages of the present invention will become apparent to those skilled in the art upon reading and understanding the following detailed description with reference to the accompanying figures.

BRIEF DESCRIPTION OF THE DRAWINGS

FIG. 7A is a diagram showing another liquid crystal display device (DMD) which can be used in the projection-type color image display apparatus according to the second example of the present invention;

FIG. 7B is an enlarged perspective view showing one pixel of the another liquid crystal display device;

DESCRIPTION OF THE PREFERRED EMBODIMENTS

Hereinafter, examples of the present invention will be described with reference to the accompanying drawings.

The dichroic mirror referred to in the present specification is formed of a dielectric multilayered film designed to reflect or transmit light selectively according to a wavelength of the light.

A cross dichroic prism 4 described hereinafter is formed from four prisms attached to each other. At the interface 4R (FIG. 1), a dielectric multilayered film which reflects R color light ray and transmits B and G color light rays is formed, while at the interface 4B, a dielectric multilayered film which reflects B color light ray and transmits R and G color light rays is formed.

The cross dichroic prism 4 is used as a color separating/synthesizing device in the following first and second examples.

A cutoff wavelength is herein defined as a wavelength of a light ray which is transmitted through or reflected by a color separating/synthesizing device with 50% transmittance or reflectance.

Now, the reason why the difference in cutoff wavelength between p-polarized light and s-polarized light in the dichroic mirrors (color separating/synthesizing device) is set to about 40 nm or less will be described with reference to FIG. 16.

Figure 16:
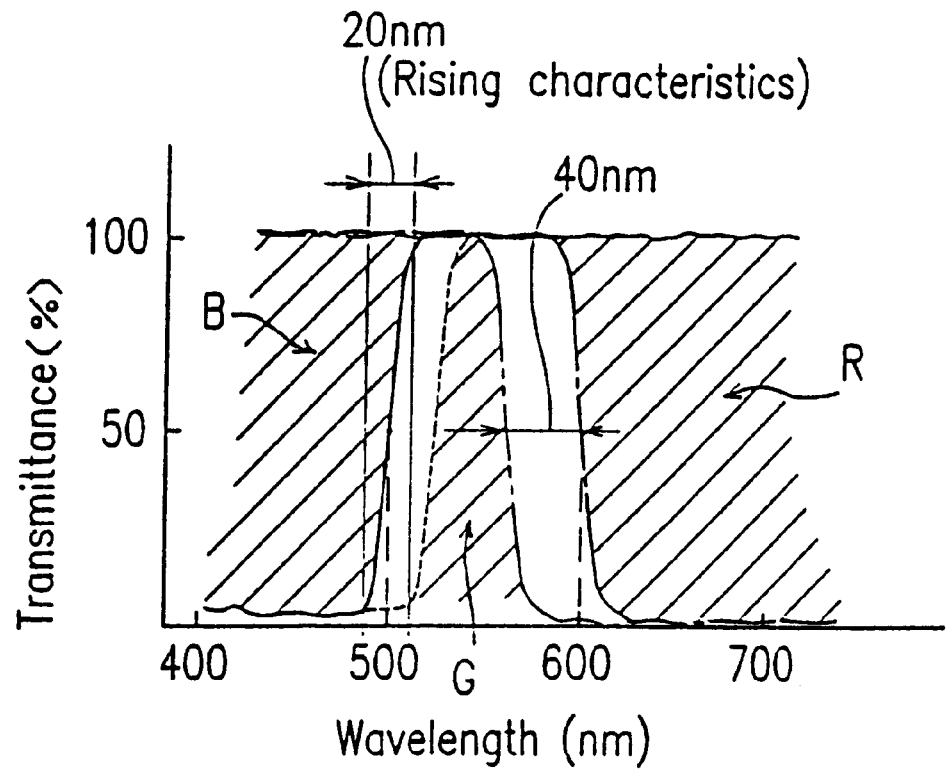
FIG. 16 is a graph for illustration of principles of the present invention, and showing characteristics of a color separating/synthesizing device used in the present invention.

In the case where respective wavelengths corresponding to about 50% transmittance of B and R color light rays are about 500 nm and about 600 nm with the difference in cutoff wavelength between p-polarized light and s-polarized light being set to about 40 nm, as shown in FIG. 16, all of the R, G and B color light rays can be effectively utilized. It should be noted that the R wavelength range is generally from about 600 nm to about 700 nm, the G wavelength range is generally from about 500 nm to about 600 nm, and the B wavelength range is generally from 400 nm to about 500 nm. In FIG. 16, s-polarized light of the B color light ray and s-polarized light of the R color light ray intersect each other at a wavelength of about 550 nm. Provided that the rising of each s-polarized light is 20 nm, the value of about 550 nm can be obtained from the following equations. For the B color light ray having s-polarization: 500 nm+10 nm (half the rising)+40 nm (the difference in cutoff wavelength)=550 nm; and for the R color light ray having s-polarization: 600 nm−10 nm (half the rising)−40 nm (the difference in cutoff wavelength)=550 nm.

In the case where the difference in cutoff wavelength is set to 40 nm, a sufficient quantity of G color light rays for practical use can be ensured. However, this quantity of light is slightly smaller than the respective quantity of R and B color light rays. Therefore, the white balance must be somewhat adjusted. As a result, it is ideally preferable to set the difference in cutoff wavelength to about 30 nm or less.

(EXAMPLE 1)

Figure 1:
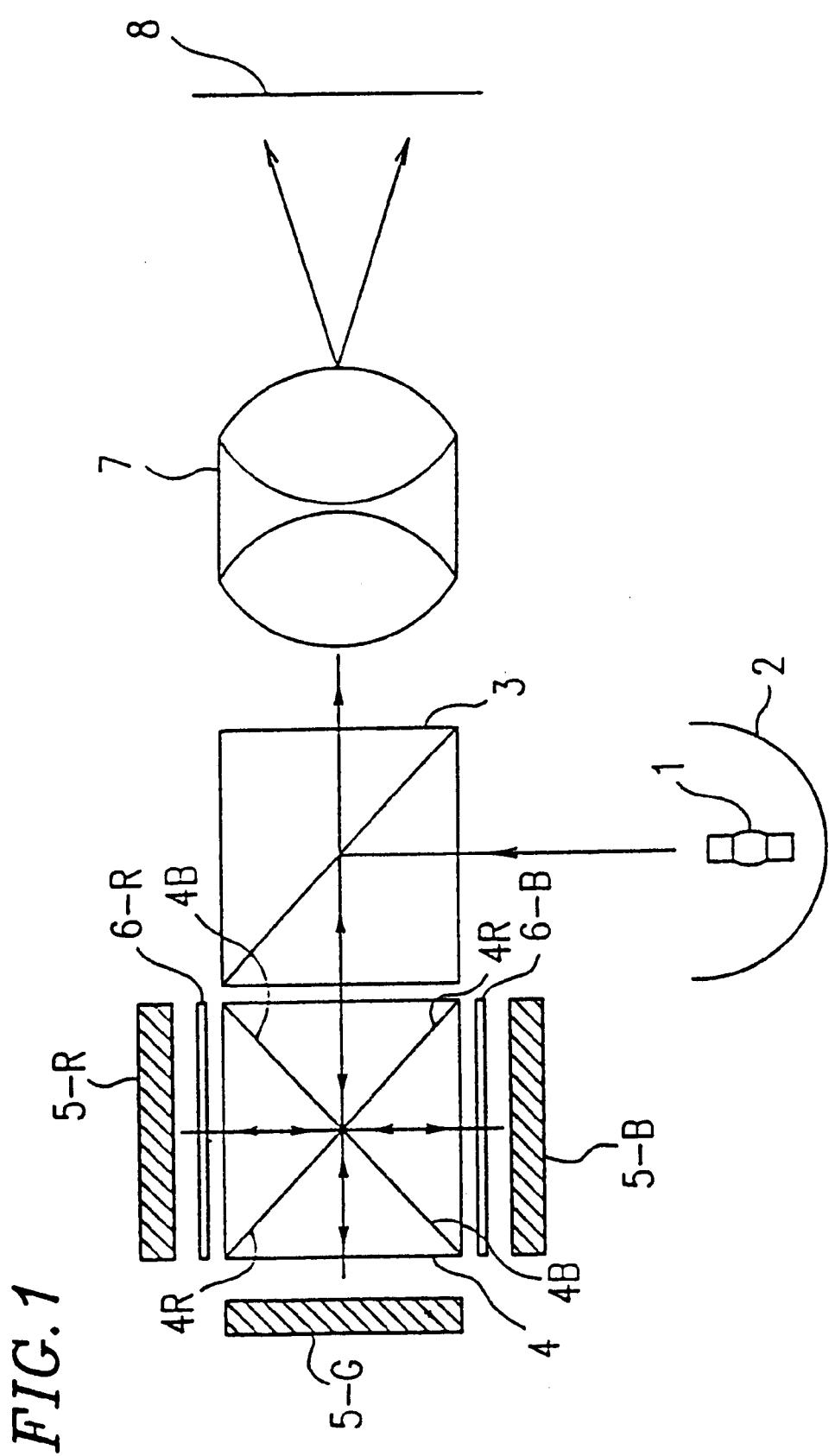
FIG. 1 is a schematic diagram showing a structure of a projection-type color image display apparatus according to a first example of the present invention.

FIG. 1 is a schematic diagram showing a projection-type color image display apparatus according to a first example of the present invention.

The present example uses a metal halide lamp of about 150 W having an arc length of about 3 mm as a light source 1. Alternatively, a halogen lamp or a xenon lamp may be used as the light source 1. Behind the light source 1 is provided a parabolic mirror 2 for reflecting light emitted from the light source 1 as approximately parallel light.

In front of the light source 1 is provided a PBS 3 for dividing light reflected from the parabolic mirror 2 into p-polarized light and s-polarized light. S-polarized light is reflected at the PBS 3 into a cross dichroic prism 4. The cross dichroic prism 4 reflects R and B color light rays out of the incident s-polarized light and transmits a G color light ray, directing the R, B and B color light rays thus separated into corresponding reflection-type liquid crystal display devices 5-R, 5-G and 5-B.

Each of the reflection-type liquid crystal display devices 5-R, 5-G and 5-B is 1.3" diagonal size S-VGA (a pixel pitch: 33 μm×33 μm) in a birefringence mode for displaying an image utilizing polarization of light. Accordingly, incident light is reflected by each of the three reflection-type liquid crystal display devices 5-R, 5-G and 5-B with its polarization state being changed according to an image signal. In the present example, a dichroic filter 6-R which restricts the range of wavelength of a red color light ray is provided in the optical path between the reflection plane 4R of the cross dichroic prism 4 and the reflection-type liquid crystal display device 5-R. In addition, a dichroic filter 6-B which restricts the range of wavelength of a blue color light ray is provided in the optical path between the reflection plane 4B of the cross dichroic prism 4 and the reflection-type liquid crystal display device 5-B. The reflection planes 4R and 4B reflects R and B color light rays, respectively. It should be noted that a dichroic filter which restricts the range of wavelength of a green color light ray may be provided in the optical path between the cross dichroic prism 4 and the reflection-type liquid crystal display device 5-G. Alternatively, dichroic filters may be provide so as to restrict at least one of the R, G and B wavelength ranges. A position of each dichroic filter is not limited to the position between the cross dichroic prism 4 and the corresponding reflection-type liquid crystal display device. Each dichroic filter can be located at any position between the light source and the reflection-type liquid crystal display device.

In the present example, the dichroic filters 6-R and 6-B are referred to as color trimming devices.

Light reflected from the liquid crystal display devices 5-R, 5-G and 5-B is again synthesized at the cross dichroic prism 4. Only p-polarized light resulting from rotation at the reflection-type liquid crystal display devices 5-R, 5-G and 5-B passes through the PBS 3 and then through a projection lens 7 onto a screen 8, whereas s-polarized light is reflected toward the light source 1.

Figure 12A:
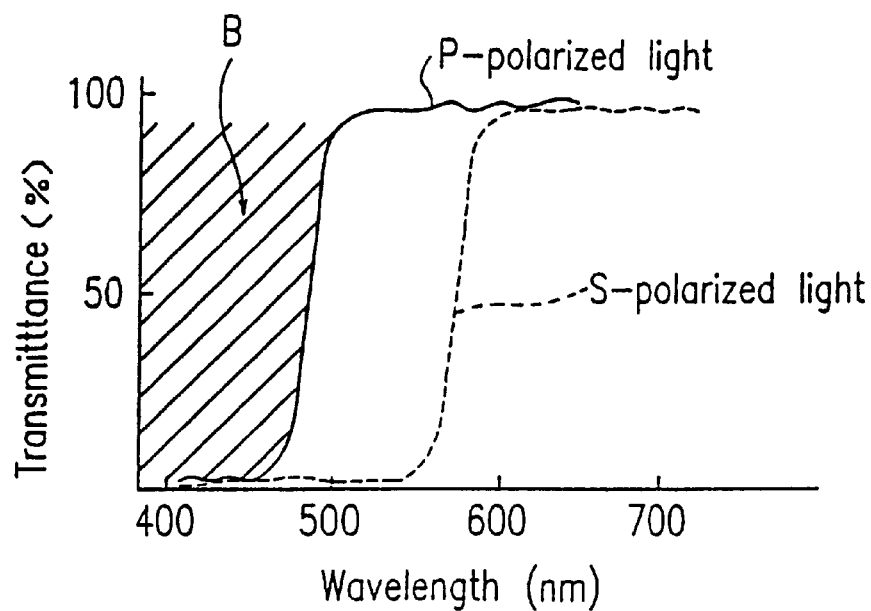
FIGS. 12A and 12B are graphs showing an example of the spectral characteristics of a conventional cross dichroic prism.
Figure 12B:
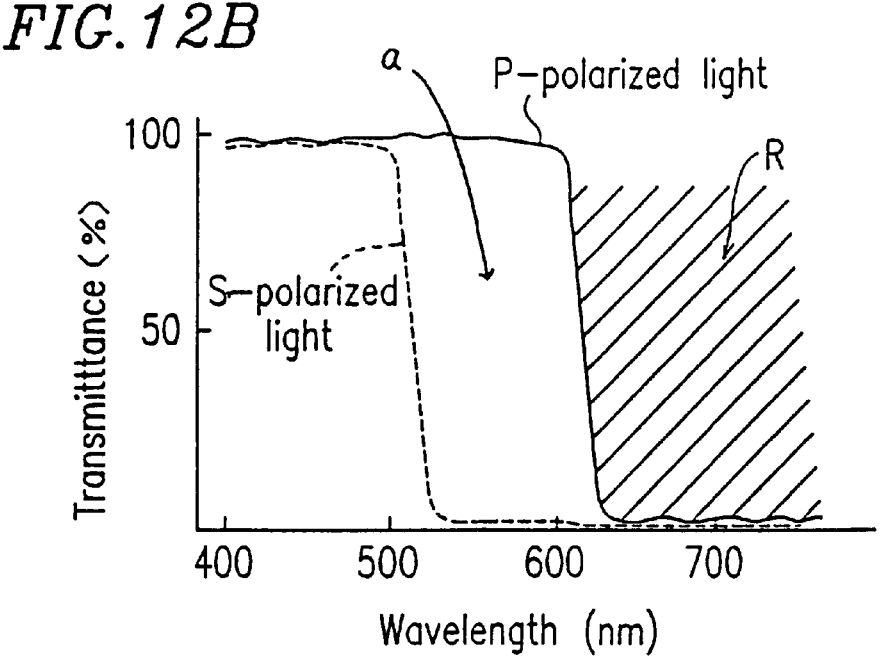
Figure 13A:
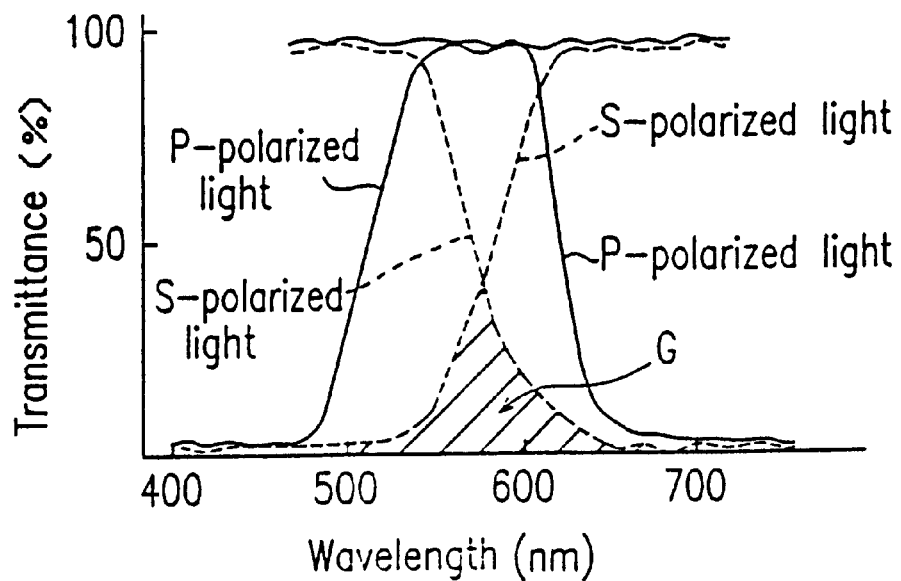
FIGS. 13A and 13B are graphs for illustration of problems which occur in a conventional cross dichroic prism.

In the projection-type color image display apparatus of the present example having such a structure as described above, incident light is divided by the cross dichroic prism 4 into R, G and B color light rays according to the spectral characteristics of the cross dichroic prism 4 with respect to s-polarized light. Then, the resultant light is rotated to p-polarized light at the respective reflection-type liquid crystal display devices 5-R, 5-G and 5-B according to an image signal, and thereafter, is again synthesized at the cross dichroic prism 4. As can be seen from FIGS. 12A and 12B showing spectral characteristics of the cross dichroic prism 4, p-polarized light has a smaller wavelength range than s-polarized light in the case of the B and R color light rays. Therefore, brightness and color purity of the respective B and R color light rays are determined by p-polarized light. On the contrary, s-polarized light has a smaller wavelength range than p-polarized light in the case of the G color light ray, as shown in FIG. 13A. Accordingly, the brightness and color purity of the G color light ray are determined by s-polarized light.

Figure 13B:
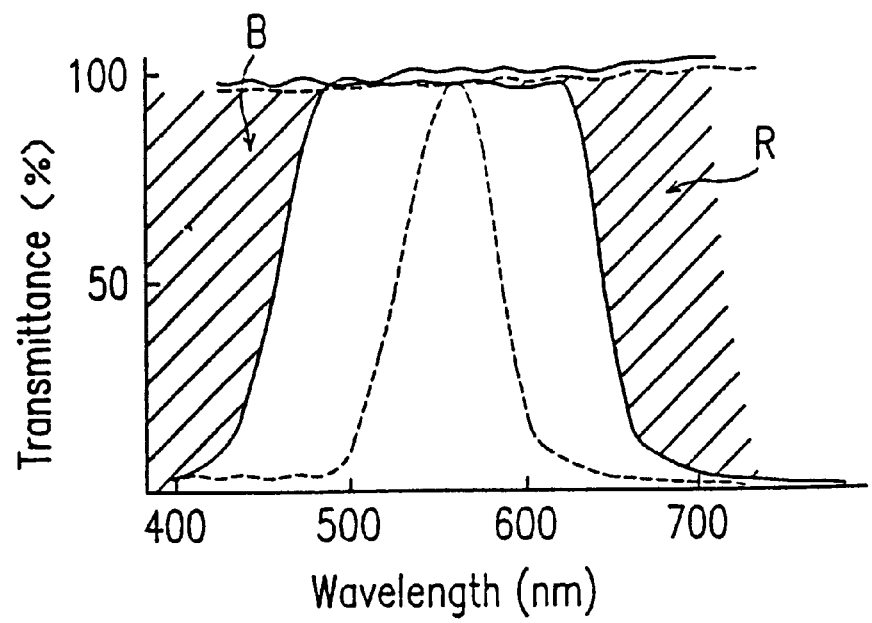
Figure 14:
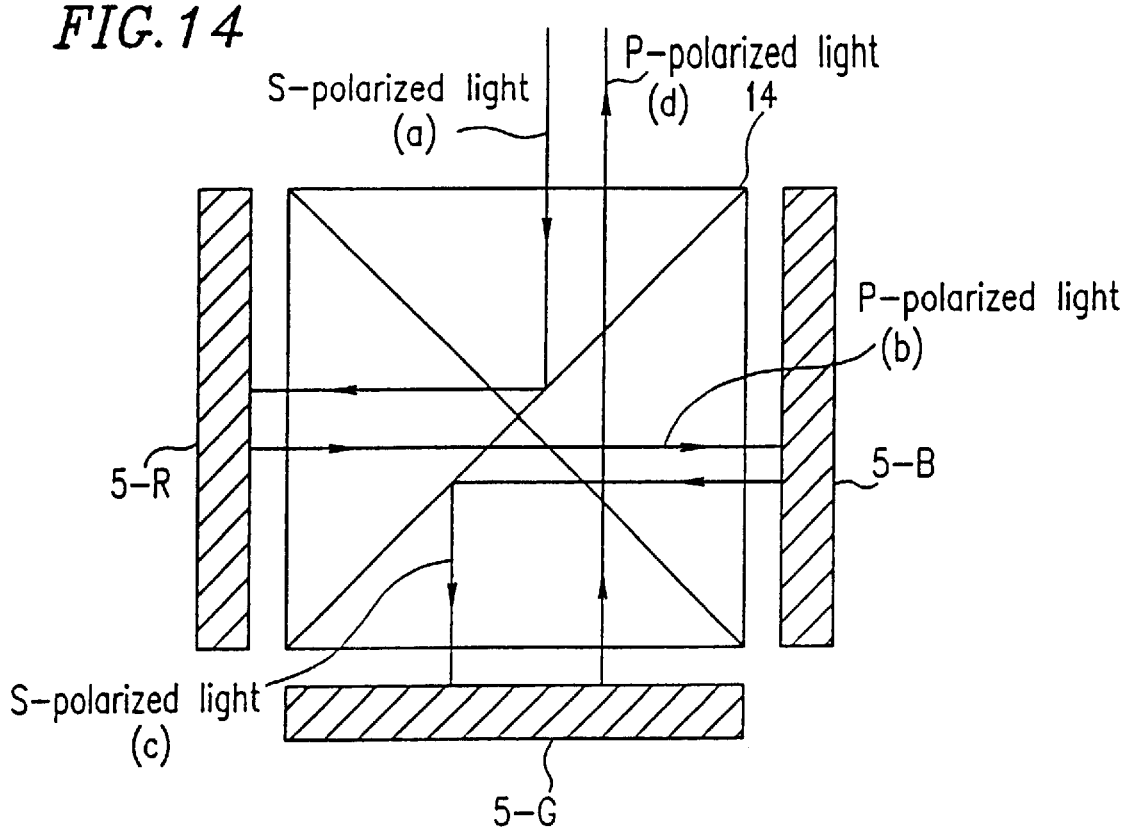
FIG. 14 is a diagram for illustration of a mechanism of generation of stray light and ghost images.
Figure 15A:
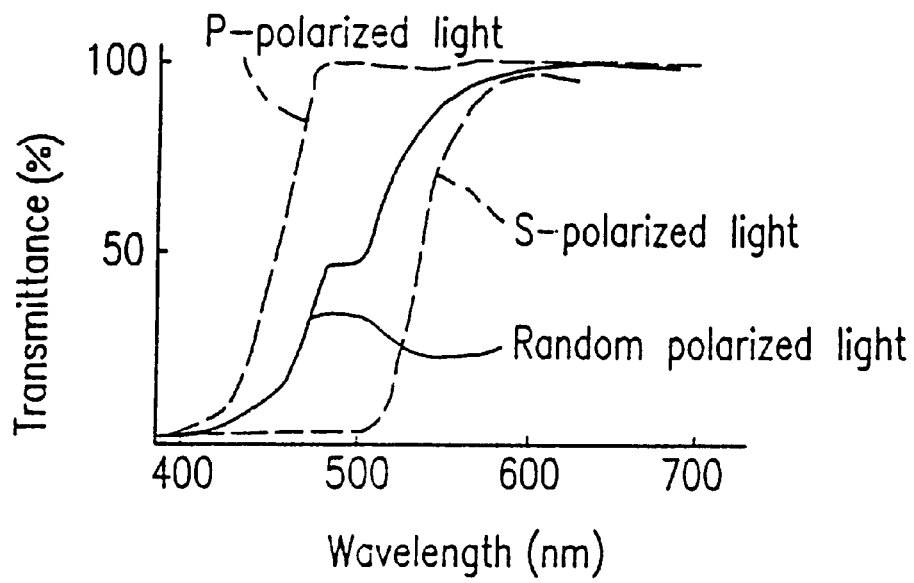
FIGS. 15A and 15B are graphs showing spectral characteristics of a conventional dichroic prism with respect to random polarized light.
Figure 15B:
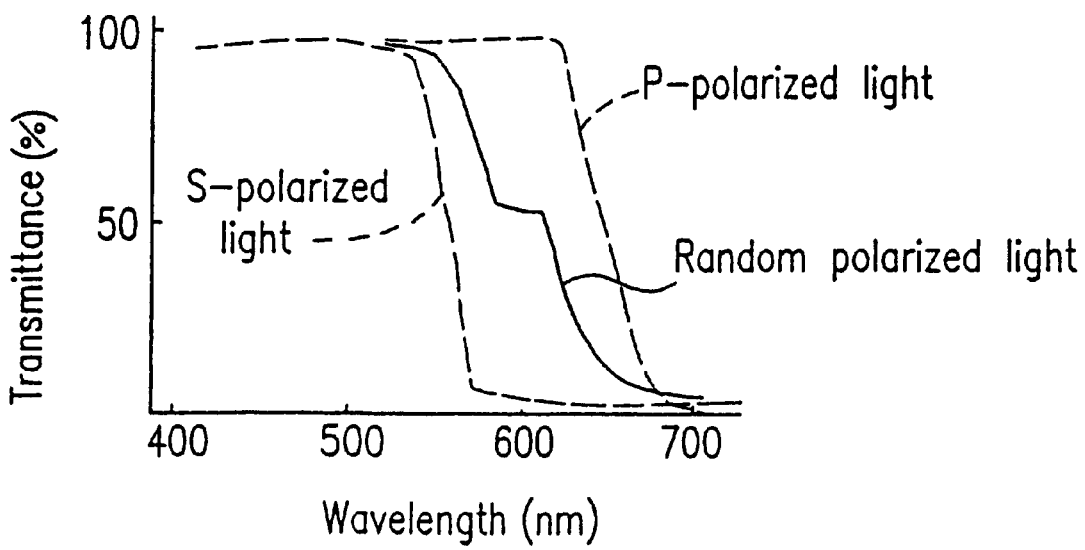

As shown in FIGS. 12A and 12B, a conventional cross dichroic prism has such spectral characteristics that a wavelength range of p-polarized light is significantly different from that of s-polarized light. In the case where such a cross dichroic prism is optimally designed with respect to R and B color light rays, the G wavelength range is reduced, as shown in FIG. 13A. Moreover, in the case where the cross dichroic prism is optimally designed with respect to a G color light ray, the R and G wavelength ranges are reduced, as shown in FIG. 13B. Accordingly, in a conventional prism, it is difficult to efficiently separate R, G and B color light rays.

Figure 3A:
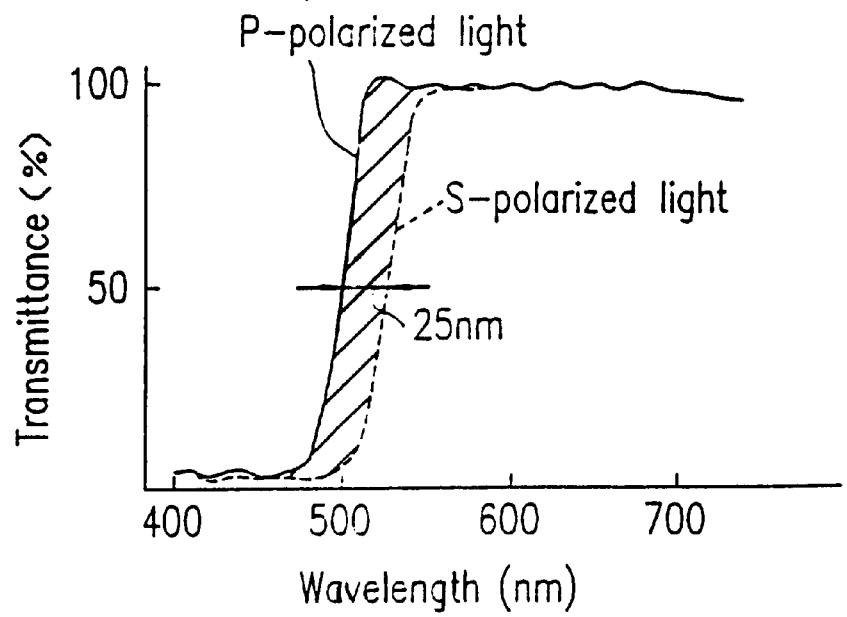
FIGS. 3A and 3B are graphs showing spectral characteristics of a cross dichroic prism included in the projection-type color image display apparatus according to the first example of the present invention.
Figure 3B:
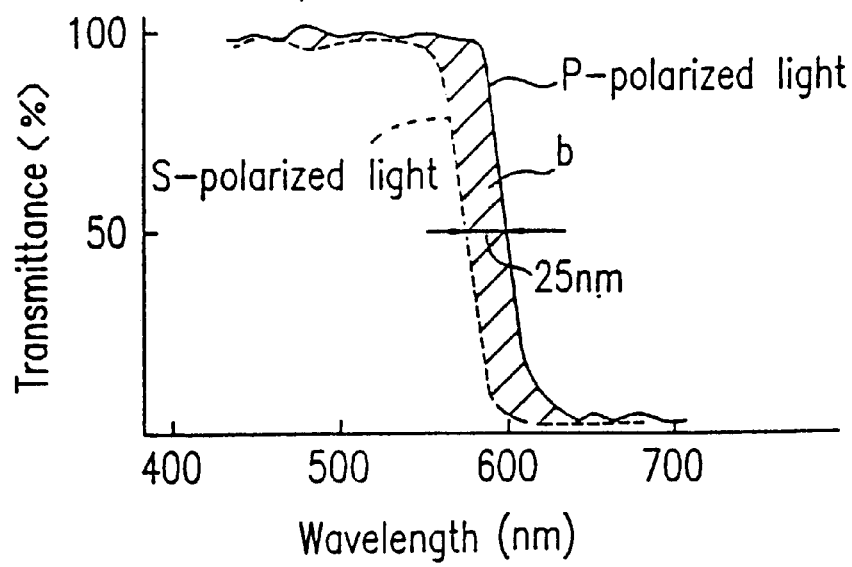

The cross dichroic prism 4 in this example of the present invention has the interfaces 4R and 4B (dichroic mirrors), each of which is designed such that spectral characteristics of p-polarized light are shifted by 25 nm from those of s-polarized light. Accordingly, as shown in FIGS. 3A and 3B, a sufficient wavelength range of p-polarized light can be ensured for respective R and B color light rays, as well as a sufficient wavelength range of s-polarized light can be ensured for a G color light ray. As a result, targeted brightness and color purity can be obtained.

The dichroic filters 6-R and 6-B located in respective optical paths of R and B color light rays have spectral characteristics similar to those of the cross dichroic prism 4 with respect to p-polarized light.

Figure 2A:
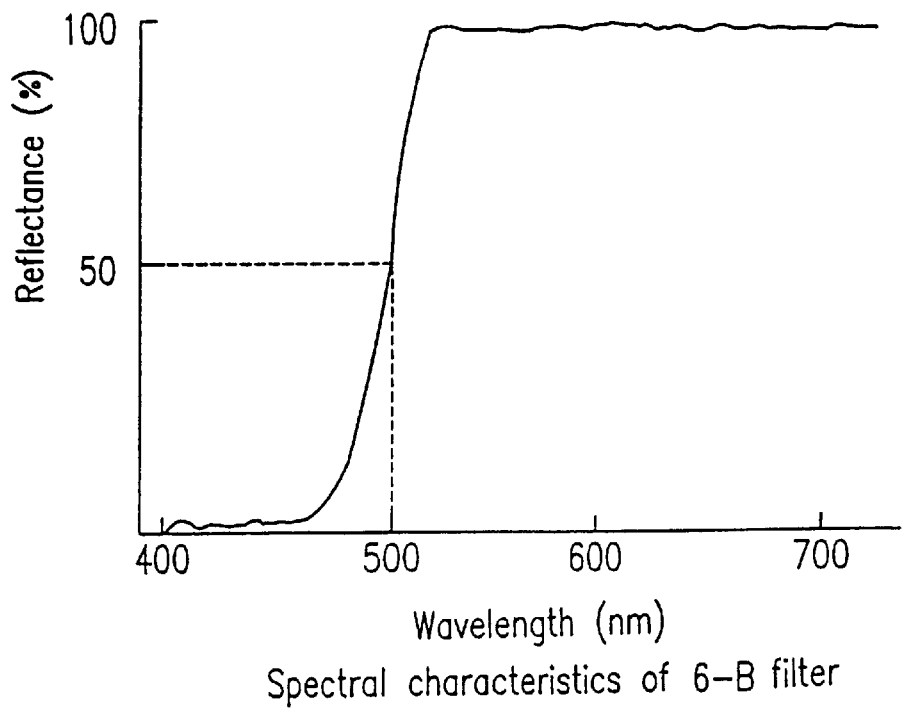
FIGS. 2A and 2B are graphs showing spectral characteristics of a dichroic filter which is included in the projection-type color image display apparatus according to the first example of the present invention.
Figure 2B:
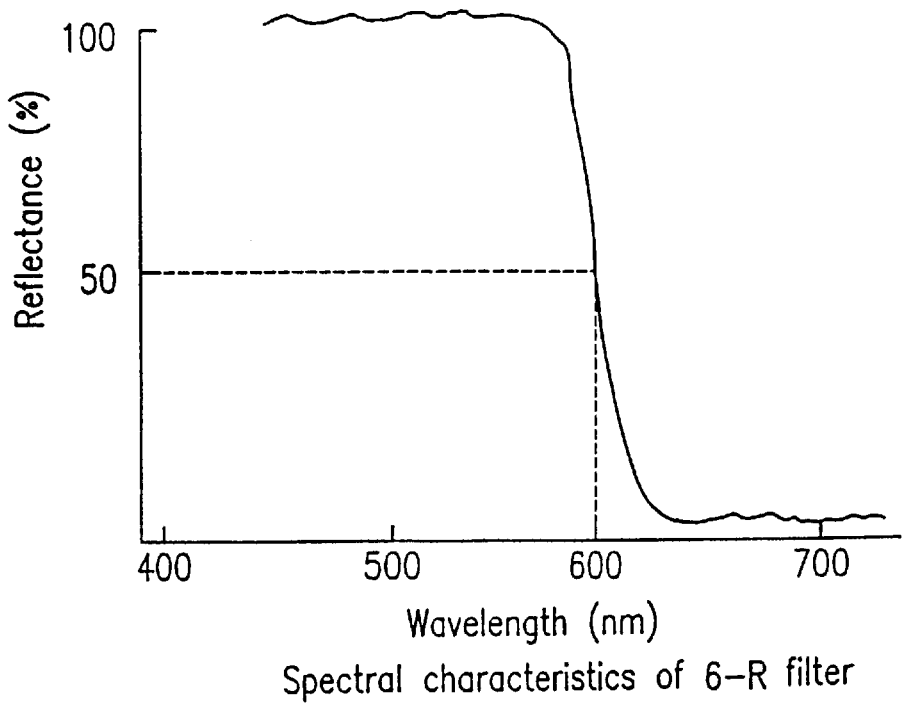

FIG. 2A shows spectral characteristics of dichroic filter 6-B which restricts the range of wavelength of a blue color light ray, and FIG. 2B shows spectral characteristics of the dichroic filter 6-R which restricts the range of wavelength of a red color light ray. Each of the dichroic filters 6-R and 6-B functions to intercept (reflect) light corresponding to the respective shaded portions shown in FIGS. 3A and 3B before the reflection-type liquid crystal display device in order to prevent stray light and ghost images which are caused by the light corresponding to the shaded portion. The light reflected by the dichroic filters has the same polarization direction as that of the incident light. Therefore, the reflected light is further reflected by the cross dichroic prism 4 and the PBS 3 back to the light source 1.

With the use of projection satisfying the above-described conditions, white light emitted from the light source 1 is efficiently utilized. As a result, a bright image having a broad range of color reproduction is achieved.

In the present example, the cross dichroic prism 4 receives s-polarized light. Alternatively, a cross dichroic prism having a similar design may be used for receiving p-polarized light. In the case where a cross dichroic prism is designed to receive p-polarized light, however, p-polarized light having a smaller wavelength range than that of s-polarized light enters reflection-type liquid crystal display devices 5-R and 5-B corresponding to respective R and B color light rays. Accordingly, stray light and ghost images are less likely to be generated with respect to these liquid crystal display devices 5-R and 5-B. However, p-polarized light having a larger wavelength range enters a reflection-type liquid crystal display device 5-G corresponding to a G color light ray. This G color light ray is rotated to s-polarized light according to an image signal by the liquid crystal display device 5-G and reflected as s-polarized light. A transmission wavelength range of the cross dichroic prism is small for the s-polarized light, and therefore, the light in the shaded portion of FIGS. 3A and 3B is reflected toward the liquid crystal display devices corresponding to the respective R and B color light rays. Since this reflected light will cause stray light and ghost images, it is desirable to provide light-reflecting or light-absorbing filters having the same spectral characteristics as or smaller spectral characteristics than those of the s-polarized light, in an optical path of the G color light ray. Alternatively, it is desirable to provide light-absorbing filters which selectively transmit the R and B color light rays, in respective optical paths.

The position of the filters and the spectral characteristics described above are exemplary only, and are not intended to limit the present invention.

(EXAMPLE 2)

Figure 4:
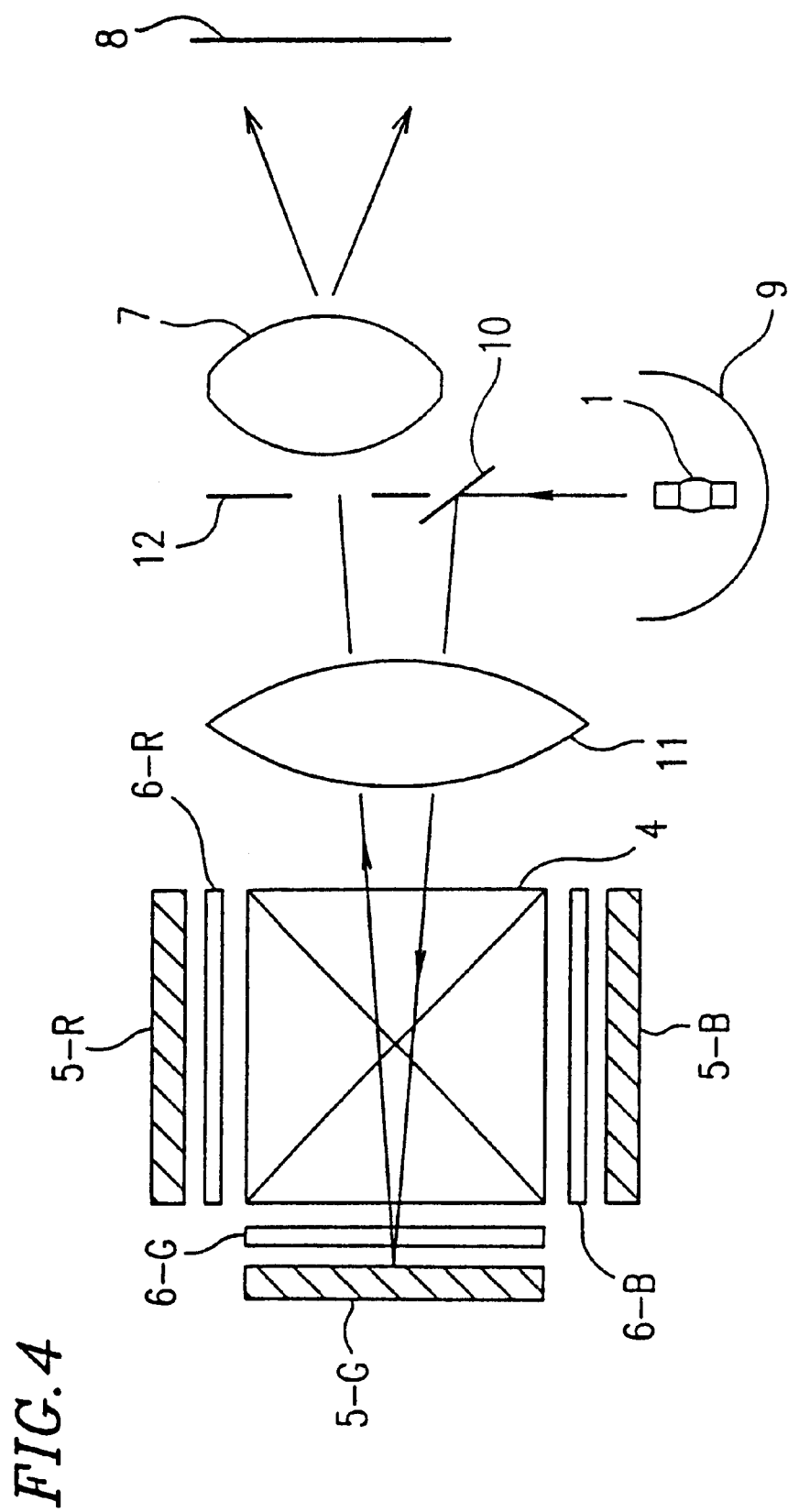
FIG. 4 is a schematic diagram showing a structure of a projection-type color image display apparatus according to a second example of the present invention.

FIG. 4 is a schematic diagram showing a projection-type color image display apparatus according to a second example of the present invention. In the present invention, like optical parts are denoted with like reference numerals and characters in the first and second examples. In FIG. 4, a collective lens 11, an aperture 12 and a projection lens 7 constitute a part of a Schlieren optical system.

In the present example, a light source 1 is provided at a first focus of an ellipsoidal reflecting mirror 9. Light emitted from the light source 1 is reflected at a reflecting mirror 10 which is provided near a second focus of the ellipsoidal reflecting mirror 9. The reflected light then passes through a collective lens 11 into a cross dichroic prism 4. The cross dichroic prism 4 reflects R and B color light rays out of the incident light, while transmitting a G color light ray. The R, G and B color light rays thus divided enter corresponding reflection-type liquid crystal display devices 5-R, 5-G and 5-B.

Figure 5A:
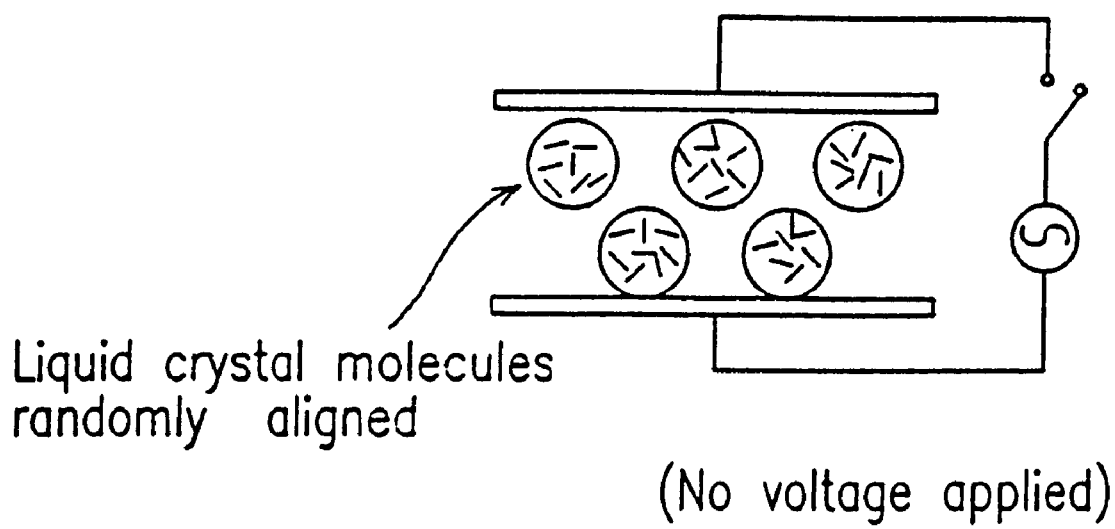
FIGS. 5A and 5B are diagrams for use in illustration of a liquid crystal display device included in the projection-type color display apparatus according to the second example of the present invention.
Figure 5B:
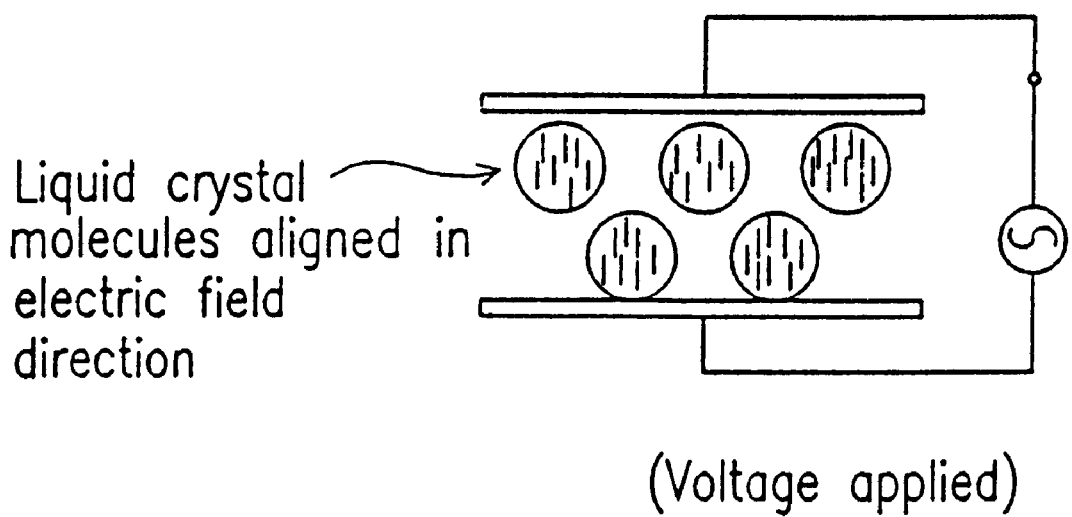

A polymer dispersed liquid crystal display device which scatters light to display an image is used as each of the reflection-type liquid crystal display devices 5-R, 5-G and 5-B. In the polymer dispersed liquid crystal display device, capsule-shaped nematic liquid crystal molecules are dispersed in a polymer, as shown in FIGS. 5A and 5B. When no voltage is applied to the polymer dispersed liquid crystal display device, liquid crystal molecules are approximately randomly oriented, as shown in FIG. 5A. Accordingly, light scatters at the interface between the liquid crystal portion and the polymer. On the other hand, when a voltage is applied to the polymer dispersed liquid crystal display device, the liquid crystal molecules will be oriented in the direction of the electric field, as shown in FIG. 5B. Therefore, in the case where a refractive index of the liquid crystal molecules in the direction of the electric field matches a refractive index of the polymer, light will not be scattered, resulting in a transparent condition. Thus, incident light is scattered according to an image signal and reflected at the three reflection-type liquid crystal display devices 5-R, 5-G and 5-B.

In FIG. 4, a dichroic filter 6-R which restricts the range of wavelength of a red color light ray is provided between the reflection-type liquid crystal display device 5-R and a plane from which an R color light ray goes out of the cross dichroic prism 4. A dichroic filter 6-G which restricts the range of wavelength of a green color light ray is provided between the reflection-type liquid crystal display device 5-G and a plane from which a G color light ray goes out of the cross dichroic prism 4. A dichroic filter 6-B which restricts the range of wavelength of a blue color light ray is provided between the reflection-type liquid crystal display device 5-B and a plane from which a B color light ray goes out of the cross dichroic prism 4.

Respective R, G and B color light rays reflected at the reflection-type liquid crystal display devices 5-R, 5-G and 5-B are again synthesized at the cross dichroic prism 4 to be collected by the collective lens 11 onto the pupil of the projection lens 7, as shown in FIG. 4. An aperture 12 for intercepting light scattered at the reflection-type liquid crystal display devices 5-R, 5-G and 5-B, while transmitting non-scattered light, is provided at the pupil of the projection lens 7. Accordingly, only light having passed through the aperture 12 passes through the projection lens 7 to be projected onto a screen 8.

Figure 17A:
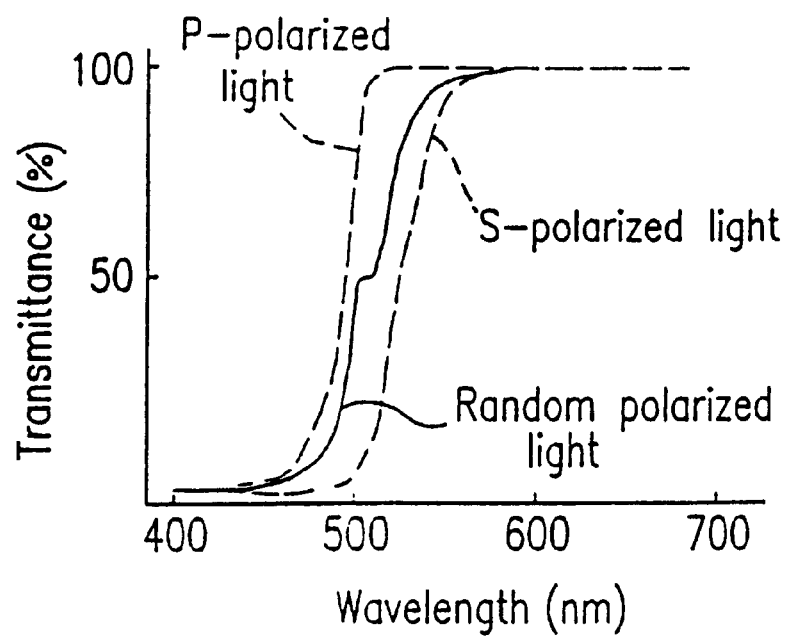
FIGS. 17A and 17B are graphs showing spectral characteristics of a cross dichroic prism to which the present invention is applied, with respect to random polarized light.
Figure 17B:
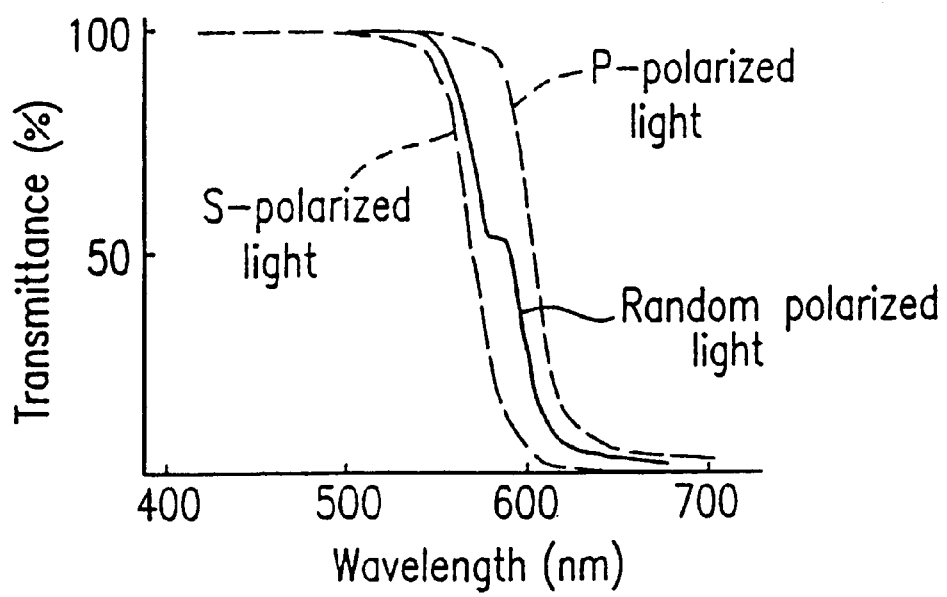

In the projection-type color image display apparatus of the present example having such a structure as described above, random polarized light enters the cross dichroic prism 4. Therefore, with respect to the random polarized light, the cross dichroic prism 4 will have mean spectral characteristics of p-polarized light and s-polarized light. Accordingly, a conventional cross dichroic prism would have spectral characteristics having a less sharp rise or fall at the boundary between the R, G and B wavelength ranges, causing significant reduction in color purity of R, G and B color light rays. However, the present example uses a cross dichroic prism similar to that of the first example. Specifically, the cross dichroic prism 4 in the example has the interfaces 4R and 4B (dichroic mirrors), each of which is designed such that spectral characteristics of p-polarized light are shifted by 25 nm from those of s-polarized light. Therefore, the difference in wavelength dependency between p-polarized light and s-polarized light is small, as shown in FIGS. 17A and 17B. As a result, such reduction in color purity of R, G and B color light rays can be prevented.

Figure 6A:
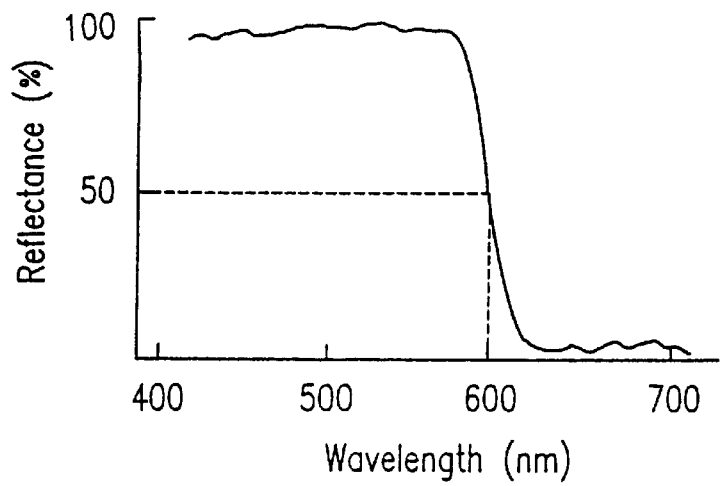
FIGS. 6A, 6B and 6C are graphs showing spectral characteristics of a dichroic filter which is included in the projection-type color image display apparatus according to the second example of the present invention.
Figure 6B:
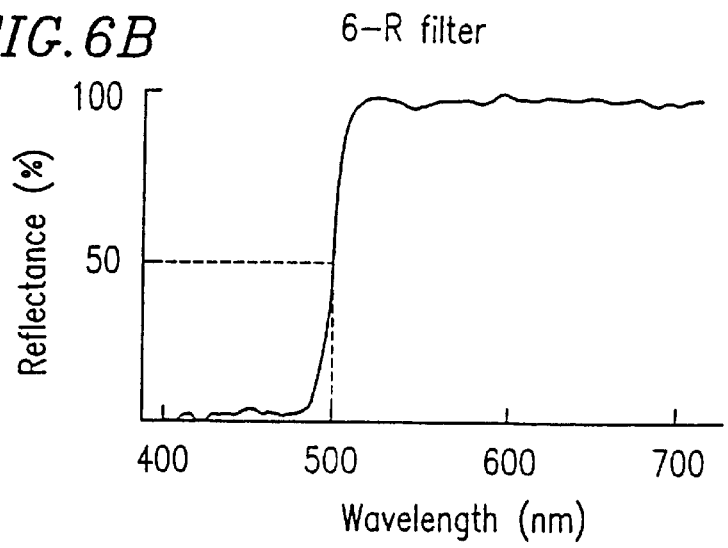
Figure 6C:
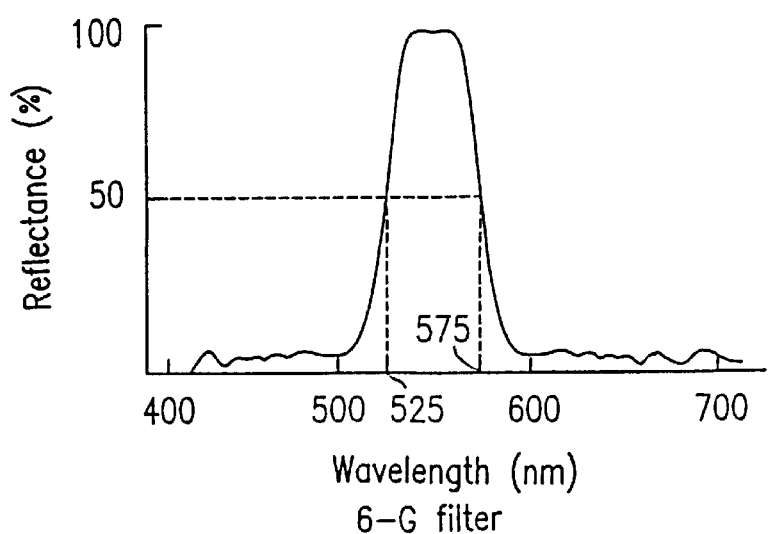

As shown in FIGS. 6A and 6B, the dichroic filters 6-R and 6-B placed in respective optical paths of R and B color light rays have spectral characteristics similar to those of the cross dichroic prism 4 with respect to p-polarized light. As shown in FIG. 6C, the dichroic filter 6-G placed in an optical path of a G color light ray has spectral characteristics similar to those of the cross dichroic prism 4 with respect to s-polarized light. It is noted that the wavelength ranges of the spectral characteristics of the dichroic filters 6-R, 6-G and 6-B are smaller than those of the cross dichroic prism 4. Therefore, color purity of R, G and B color light rays projected onto a screen 8 is substantially determined by these dichroic filters.

In addition, the cross dichroic prism 4 used in the present example is optimally designed for R and B color light rays having p-polarization as well as optimally designed for a G color light ray having s-polarization, as described in the first example. Accordingly, further improvement in color purity can be achieved as compared to the case where only the cross dichroic prism 4 is used.

With the use of projection satisfying the above-described conditions, both p-polarized light and s-polarized light contained in white light emitted from the light source 1 are efficiently utilized by the light-scattering liquid crystal display devices. As a result, a bright image having a broad range of color reproduction is achieved.

In the present example, filters for correcting color purity are provided in all of the optical paths of R, G and B color light rays. However, in an optical path which does not require correction of color purity, such a filter need not always be provided. For example, a filter may be provided so as to restrict at least one of the R, G and B wavelength ranges.

Although a light-scattering image display device is used as a non-polarization mode image display device in the present example, devices such as a DMD (digital mirror device) reported in "INTERNATIONAL ELECTRON DEVICES MEETING; WASHINGTON, D.C., Dec. 5–8, 1993" may be used alternatively. As shown in FIGS. 7A and 7B, this DMD is designed to be capable of changing the angle of a mirror forming each pixel by static electricity, whereby the angle of outgoing light from the mirror will be changed.

Figure 8:
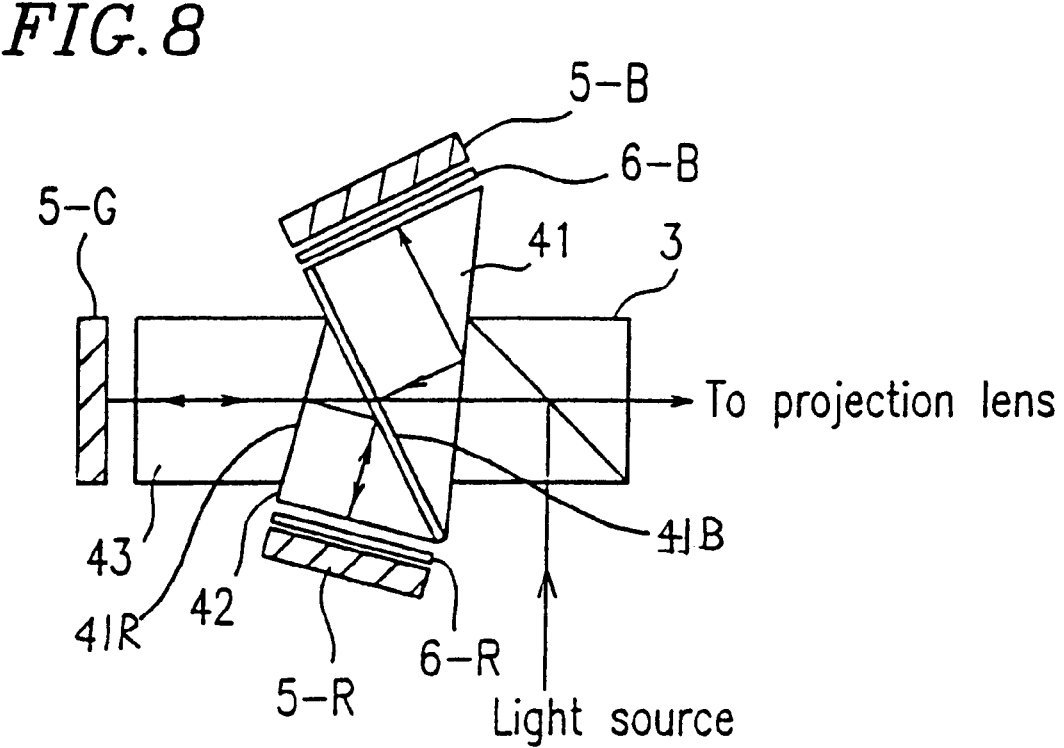
FIG. 8 is a schematic diagram showing a color separating/synthesizing device having another structure which can be used in the present invention.
Figure 9A:
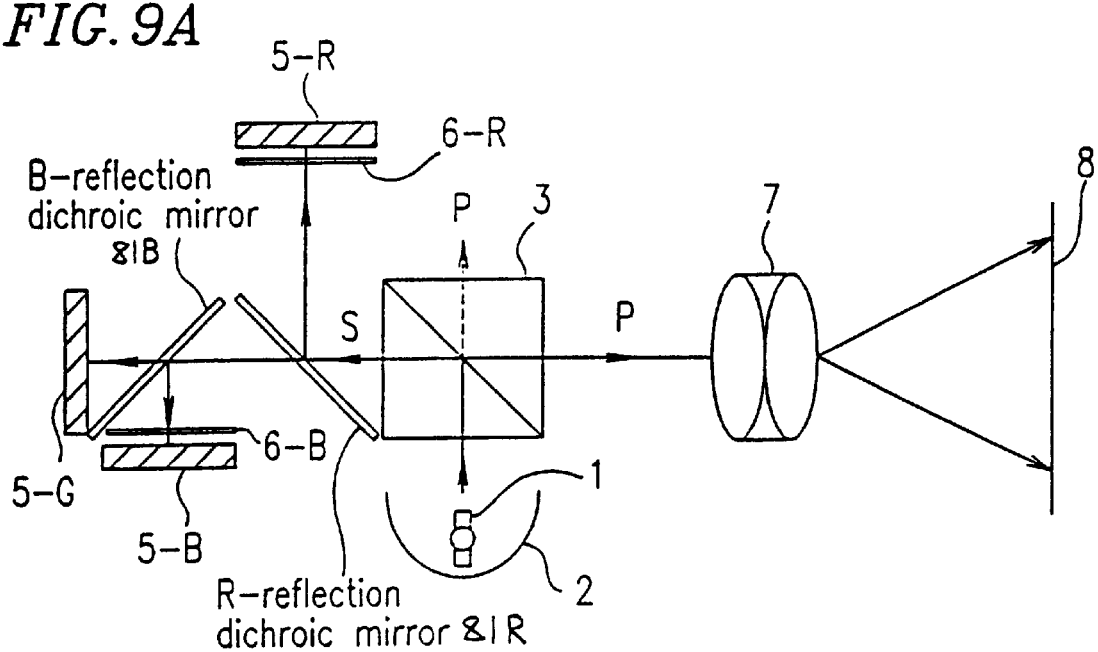
FIG. 9A is a schematic diagram showing a color separating/synthesizing device having still another structure which can be used in the present invention.
Figure 9B:
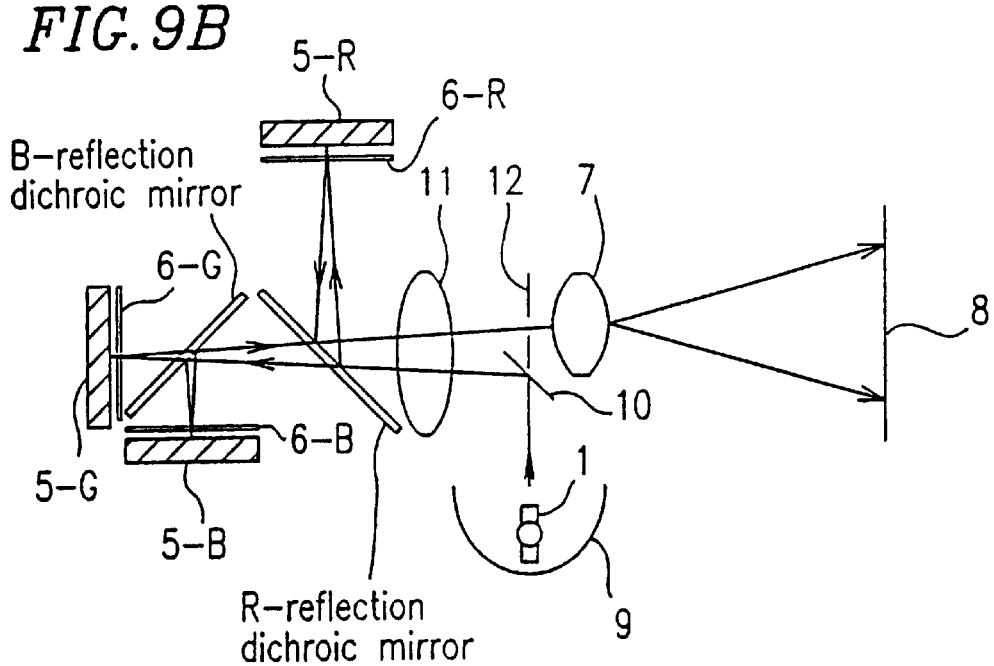
FIG. 9B is a schematic diagram showing a color separating/synthesizing device having yet another structure which can be used in the present invention.
Figure 10:
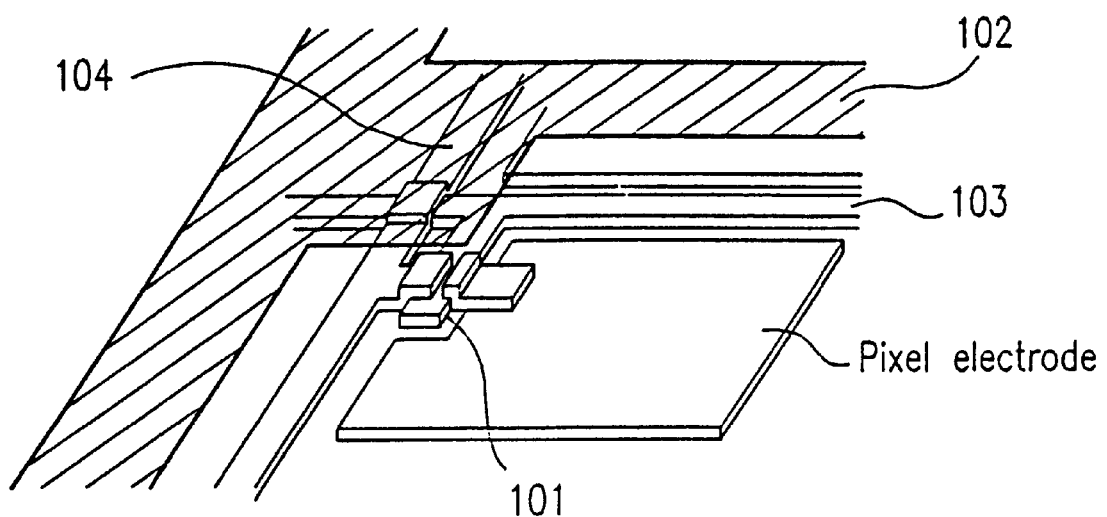
FIG. 10 is a perspective view for use in illustration of a pixel structure of a transmission-type liquid crystal display device.
Figure 11:
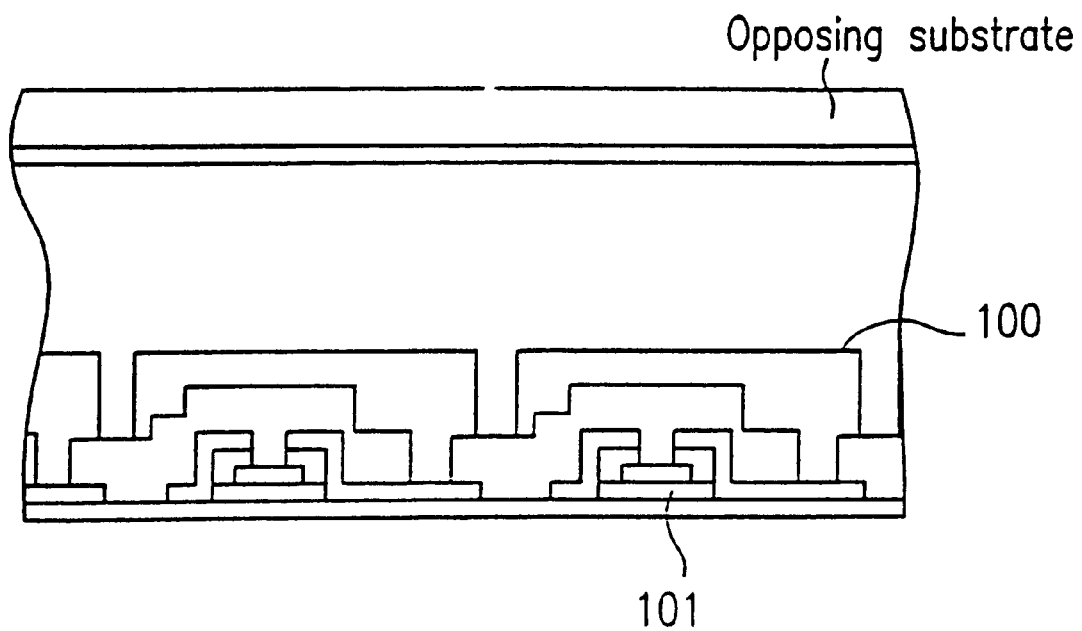
FIG. 11 is a cross sectional view showing a reflection-type liquid crystal display device.

A cross dichroic prism formed of four prisms attached to each other is used as a color separating/synthesizing device in the first and second examples. However, the present invention is not limited to this. For example, a prism formed of three prisms 41, 42 and 43 as shown in FIG. 8, and a device using a plurality of dichroic mirrors as shown in FIGS. 9A and 9B may be used, as long as it can divide and synthesize light. Note that the device of FIG. 9A has a structure for use in the projection-type image display apparatus of the first example, whereas the device of FIG. 9B has a structure for use in the projection-type image display apparatus of the second example. Like elements are denoted with like reference numerals and characters in FIGS. 9A and 9B.

As has been described above, according to the present invention, a less polarization-dependent color separating/synthesizing device such as a dichroic prism or a dichroic mirror having a difference in cutoff wavelength between p-polarized light and s-polarized light set to about 40 nm or less is used. Therefore, a bright image having excellent resolution, a broad range of color reproduction, and excellent white balance can be achieved. In addition, a light restricting device for restricting a spectrum of light incident on image display devices respectively corresponding to R, G and B color light rays is provided. As a result, stray light and ghost images resulting from the polarization dependency of the color separating/synthesizing device can be prevented. Moreover, color purity can be further improved as compared to the case where only such a dichroic prism or a dichroic mirror as described above is used.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A projection-type display apparatus comprising:

a light source;

a color separating/synthesizing device having red and blue reflection planes that are arranged to separate light from the light source into red, green and blue light rays; and three reflection-type display devices arranged to modulate the red, green and blue light rays, respectively, wherein the color separating/synthesizing device is further arranged to synthesize the red, green and blue light rays respectively modulated by the three reflection-type display devices, wherein a spectral characteristic of the red reflection plane provides for a difference in a cutoff wavelength between an s-polarized light ray component and a p-polarized light ray component of the red light ray that is equal to or less than 40 nm and a spectral characteristic of the blue reflection plane provides for a difference in a cutoff wavelength between an s-polarized light ray component and a p-polarized light ray component of the blue light ray that is equal to or less than 40 nm, and wherein the spectral characteristic of the red reflection plane for the s-polarized light ray component of the red light ray duplicates the spectral characteristic of the blue reflection plane for the s-polarized light ray component of the blue light ray within a wavelength region in which the transmittivity of light on the red and blue reflection planes of the color separating/synthesizing device is saturated.

2. A projection-type display apparatus according to claim 1, further comprising:

a polarized-light separating device arranged to reflect a first polarized light ray from the light source at a predetermined angle, while transmitting a second polarized light ray, the first polarized light ray having a first polarization state, the second polarized light ray having a second polarization state different from the first polarization state, the polarized-light separating device being further arranged to direct one of the first and second polarized light rays into the color separating/synthesizing device, wherein each of the three reflection-type display devices is a birefringence-mode display device which changes polarization of the one of the first and second polarized light rays.

3. A projection-type display apparatus according to claim 1, wherein each of the three reflection-type display devices is a light-scattering liquid crystal display device, the projection-type display apparatus further comprising:

a Schlieren optical system arranged to selectively intercept light scattered at the light-scattering liquid crystal display devices.

4. A projection-type display apparatus according to claim 1, wherein each of the three reflection-type display devices is a display device capable of changing an angle of outgoing light to a prescribed angle, the projection-type display apparatus further comprising:

an optical system arranged to selectively project outgoing light onto a screen according to an angle of the outgoing light.

5. A projection-type display apparatus according to claim 1, further comprising:

a color trimming device for correcting color purity arranged in an optical path between the light source and at least one of the three reflection-type display devices so as to restrict a wavelength range of at least one of the red, green and blue light rays.

6. A projection-type display apparatus according to claim 5, wherein the color trimming device restricts light rays having s-polarization.

7. A projection-type display apparatus according to claim 5, wherein the color trimming device restricts light rays having random polarization.

8. A projection-type display apparatus according to claim 1, wherein the color separating/synthesizing device includes a plurality of laminated glass prisms.

9. A projection-type display apparatus according to claim 1, wherein the spectral characteristic of the red reflection plane for the s-polarized light ray component of the red light ray and the spectral characteristic of the blue reflection plane for the s-polarized light ray component of the blue light ray intersect at about 550 nm.

10. A projection-type display apparatus according to claim 1, wherein a spectral characteristic of the red reflection plane provides for a difference in a cutoff wavelength between an s-polarized light ray component and a p-polarized light ray component of the red light ray that is equal to or less than 30 nm and a spectral characteristic of the blue reflection plane provides for a difference in a cutoff wavelength between an s-polarized light ray component and a p-polarized light ray component of the blue light ray that is equal to or less than 30 nm.

11. A projection-type display apparatus comprising:

a light source;

a color separating/synthesizing device having red and blue reflection planes that are arranged to separate light from the light source into red, green and blue light rays; and three reflection-type display devices arranged to modulate the red, green and blue light rays, respectively, wherein the color separating/synthesizing device is further arranged to synthesize the red, green and blue light rays respectively modulated by the three reflection-type display devices, wherein a spectral characteristic of the red reflection plane of the color separating/synthesizing device provides a difference in a cutoff wavelength between an s-polarized component and a p-polarized component of the red light ray that is equal to or less than 40 nm and a spectral characteristic of the blue reflection plane of the color separating/synthesizing device provides a difference in a cutoff wavelength between an s-polarized component and a p-polarized component of the blue light ray that is equal to or less than 40 nm, and wherein the spectral characteristic of the red reflection plane for the s-polarized component of the red light ray and the spectral characteristic of the blue reflection plane for the s-polarized component of the blue light ray intersect at a wavelength at which the transmittivity of light on the red and blue reflection planes of the color separating/synthesizing device is about 100%.

* * * * *